March 3, 1931.  R. CASTELLUCCI  1,794,833
FOOD CONDITIONING MACHINE
Filed June 16, 1928   3 Sheets-Sheet 3

WITNESSES:

INVENTOR:
Romeo Castellucci,
BY
ATTORNEY.

Patented Mar. 3, 1931

1,794,833

UNITED STATES PATENT OFFICE

ROMEO CASTELLUCCI, OF PHILADELPHIA, PENNSYLVANIA

FOOD-CONDITIONING MACHINE

Application filed June 16, 1928. Serial No. 285,905.

My invention relates to food conditioning machines and more particularly to a machine for mashing, slicing, dicing, or otherwise subdividing vegetables, fruits and the like.

The object of the invention is to provide a machine of this character in which vegetables and fruits can be mashed or subdivided with a minimum expenditure of time and energy.

The invention consists in a hollow casing having integrally formed therewith a tubular member the interior of which communicates with the interior of the casing. The casing is arranged for the mounting of a plunger, the rod of which is slotted longitudinally and rides on rollers extending transversely of the casing, said rod being projectable into the casing which also contains operating mechanism for the plunger. The tubular member is provided on its upper side with an opening, said opening being in communication with the interior of a feed hopper secured to the upper side of the tubular member. With the above mechanism may be associated a plurality of knives for cutting material into suitable shapes as positioned forced against the knives by the plunger and a second knife may be mounted for rotation transversely of the path of travel of the material for cutting the same into suitable lengths.

Figure 1:
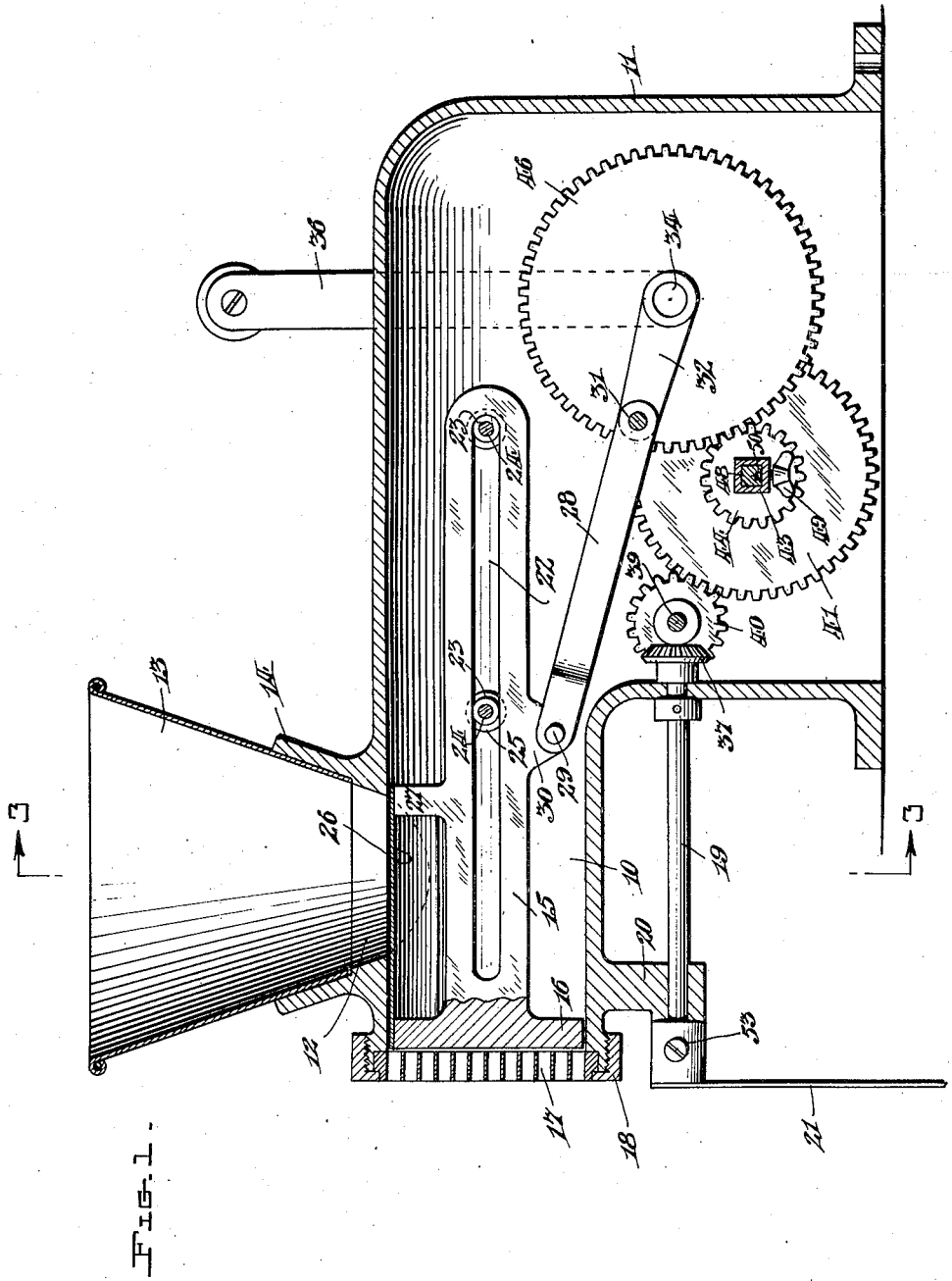
Figure 2:
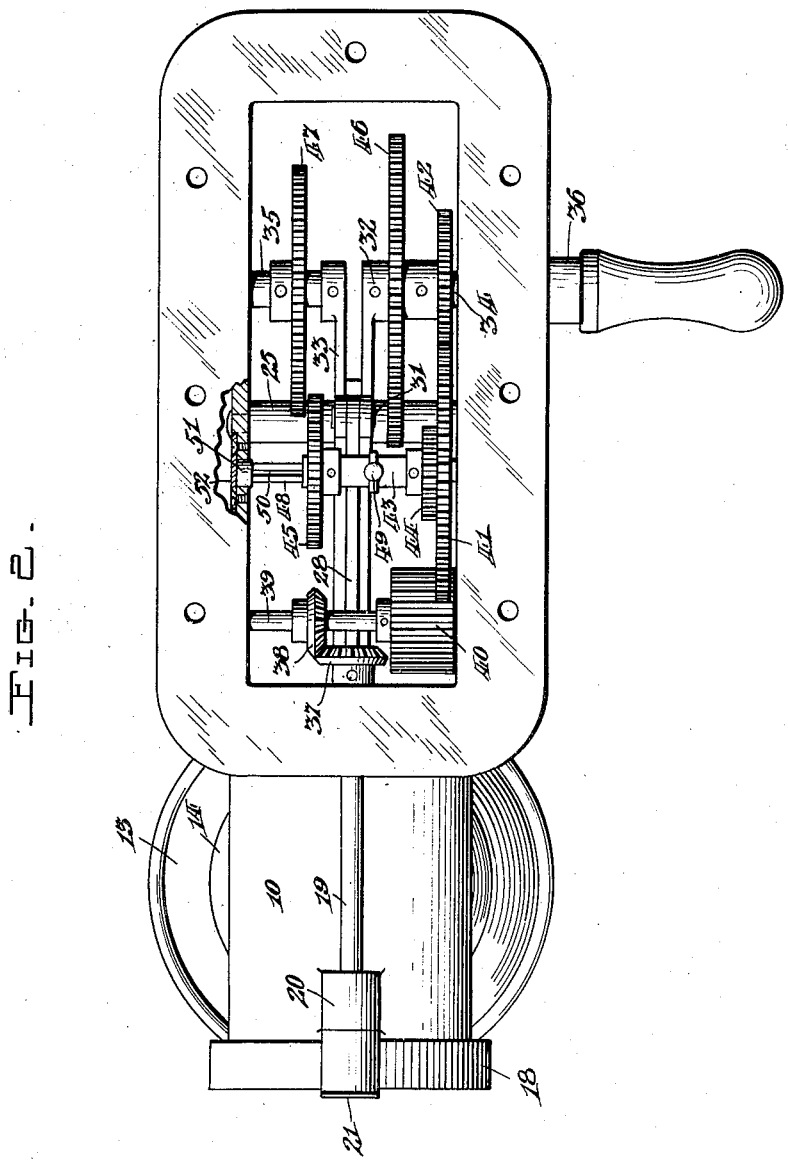
Figure 3:
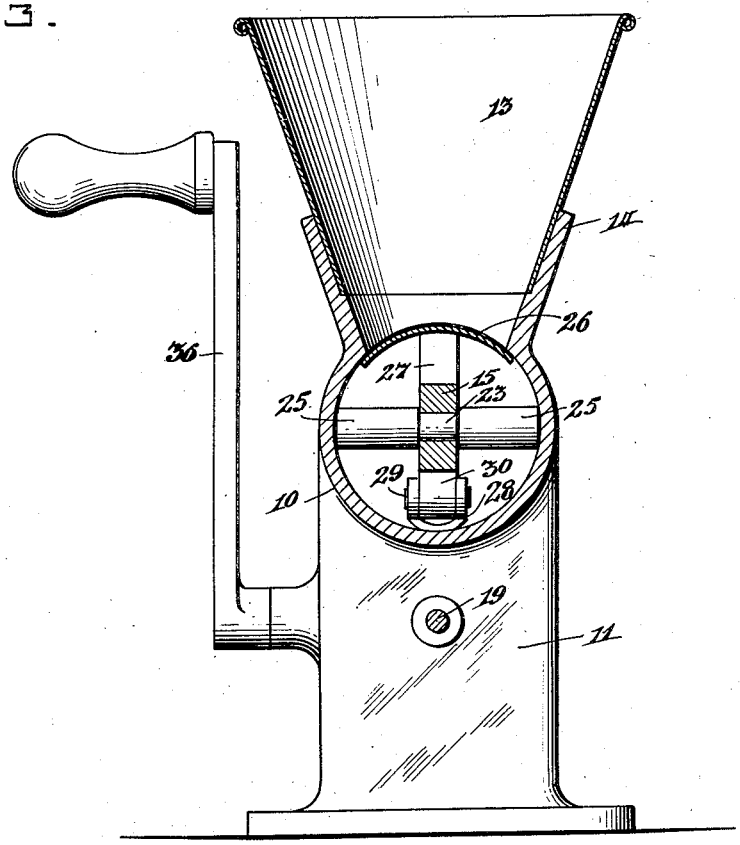
Figure 4:
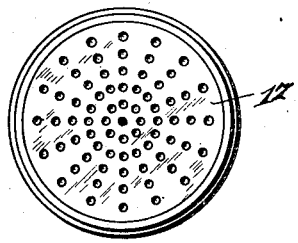
Figure 5:
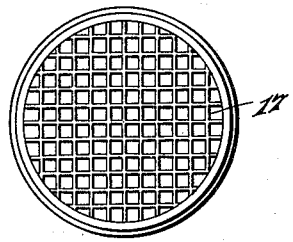

Figure 1 is a central longitudinal section through a machine constructed according to my invention, Figure 2 a bottom plan view thereof, Figure 3 a cross-section taken on line 3—3 on Figure 1, and Figures 4 and 5 face views of cylinder heads or end plates through which the material being operated upon may be forced.

Referring more in detail to the drawings, a cylinder 10 is joined to or formed integral with the housing 11 of the machine and has an opening 12 in its upper side communicating with a hopper 13 supported in a flange 14. A piston rod 15, slidably mounted in the cylinder and extending rearwardly into the housing, carries a head 16 slidably fitted in the cylinder and adapted to force the material being operated upon through openings in a cylinder head 17 which may be removably secured to the front end of the cylinder by a ring 18 threaded upon the end of the cylinder.

A shaft 19, rotatably mounted in the front wall of the housing and in a bearing 20 extending from the cylinder, has a knife 21, removably secured on its outer end which is adapted to rotate across the face of the cylinder head and cut the material, expelled through the openings in the cylinder head, into the desired lengths.

The piston rod may be held in vertical alignment with the axis of the cylinder by providing it with a longitudinal slot 22, the edges of which engage rollers 23 mounted upon shafts 24 secured to the housing. The diameter of the rollers is slightly less than the width of the slot so as to allow the piston rod to reciprocate freely in the cylinder without perceptible vertical movement. The piston rod may be held against transverse movement by spacers 25 mounted upon shafts 24 between the sides of the piston rod and the side walls of the housing.

When the piston is in its forward position, opening 12 is closed by a slide 26 which may have one of its ends secured to the piston head and its other end secured to a lug 27 extending from the piston rod. When the piston is retracted, the slide will uncover opening 12 and allow material to fall from the hopper into the cylinder so that it may be carried forwardly and forced through the openings in the cylinder head by the forward movement of the piston which carries slide 26 forwardly with it and closes opening 12 for retaining the balance of the material in the hopper until the piston has been once more retracted.

The piston may be reciprocated by a link 28 having its bifurcated forward end connected by a pin 29 to a bearing 30 formed on the piston rod and its rear end connected by a pin 31 between the ends of a pair of cranks 32 and 33 fixed, respectively, to shafts 34 and 35 mounted in the housing in axial alignment with one another; shaft 34 extends through the wall of the housing and has an operating handle 36 secured on its outer end. When handle 36 is turned, cranks 32 and 33 will be rotated and the piston rod reciprocated through link 28.

When material, such as boiled potatoes, is to be mashed, a cylinder head having a multitude of small openings, such as the one shown in Figure 4, is secured to the end of the cylinder and the material forced therethrough. When material, such as raw potatoes, is to be diced or otherwise subdivided, a cylinder head such as that shown in Figure 5 is secured to the end of the cylinder, it being intended that a number of cylinder heads, having openings of various shapes and sizes, be provided with each machine so that the material may be subdivided into various forms. For example, the cylinder head for producing "shoe string potatoes" would have small rectangular openings; for diced potatoes, the cylinder head would have larger rectangular openings; and for sliced potatoes or Saratoga chips, the cylinder head would have elongated apertures or slots.

When producing diced potatoes, Saratoga chips, and the like, it is desirable that the material should be cut into lengths as it is expelled from the cylinder head and this is accomplished by rotating knife 21 across the face of the cylinder head a predetermined number of times to each reciprocation of the piston. It is also desirable that the speed of the knife may be regulated, relatively to the speed of the piston, so as to cut the expelled material into different lengths.

The knife may be rotated by providing the inner end of shaft 19 with a bevel pinion 37 meshing with a bevel pinion 38 fixed on a shaft 39 having a wide faced gear 40 fixed thereon and meshing with a gear 41 which also meshes with a gear 42 fixed on shaft 34.

The speed of the knife, relative to the speed of the piston, may be regulated by mounting gear 41 on a sleeve 43 which also carries gears 44 and 45 adapted to mesh, respectively, with gears 46 and 47 fixed on shafts 34 and 35, respectively; the pair of gears 41—42 having a different ratio from that of either of the pairs of gears 44—46 or 45—47.

Sleeve 43 is slidable upon a shaft 48 mounted in the side walls of the housing and gears 41, 44 and 45 may be selectively engaged with gears 42, 46 and 47 by sliding the sleeve along shaft 48 and held in engagement therewith by means of a set screw 49 threaded through the sleeve and extending into a groove 50 disposed longitudinally of shaft 48.

In order that the gears on the sleeve may be fixed against rotation relatively to one another, they may be keyed or pinned to the sleeve or the sleeve may be rectangular in cross-section, as shown. In the latter case, shaft 48 is rectangular in cross-section and provided with cylindrical journals 51 on each end, one of which must have a diameter at least as great as the long diameter of the square part of the shaft in order that the shaft may be inserted in the housing. The shaft may be held against axial movement by caps 52 secured to the side walls of the housing.

Assuming that the piston is in its forward position and that diced potatoes are to be made, a cylinder head having square openings would be secured to the end of the cylinder, sleeve 43 shifted to bring the proper pair of gears into mesh, set screw 49 tightened to hold the sleeve in this position, potatoes placed in the hopper, and handle 36 turned.

During the first half-turn of the handle, the piston and slide would be retracted, uncovering opening 12 and allowing one or more potatoes to fall into the cylinder. During the next half-turn of the handle, the piston and slide would move forwardly, cover opening 12 and force the potatoes in the cylinder through the openings in the cylinder head. As the knife is rotated constantly while the handle is being turned, it will cut the expelled material into predetermined lengths.

When the machine is used for mashing, the knife may be removed by loosening a set screw 53 or the gears on the sleeve may be moved out of mesh with any gear on shafts 34 or 35 by shifting sleeve 43.

It is to be understood that the apparatus herein specifically described is intended to be illustrative of the principles of the invention and to in no way bind me to the specific embodiment of the invention herein disclosed and that the apparatus illustrated may be modified and changed in various ways without departing from the invention herein set forth and hereinafter claimed.

I claim:

1. A food conditioning machine including a housing, a cylinder on the housing, a hopper communicating with the interior of the cylinder, an apertured cylinder head closing one end of the cylinder; a piston head reciprocable in the cylinder, a piston rod provided with an elongated longitudinally disposed slot, supports for said piston rod extending through said slot, a cut off plate having its forward end secured to the piston head, a lug on the piston rod supporting the rear end of the plate, and means for reciprocating the piston.

2. A food conditioning machine including a housing, a cylinder on the housing, a hopper communicating with the interior of the cylinder, an apertured cylinder head closing one end of the cylinder, a piston head reciprocable in the cylinder, a piston rod integral with the piston head and comprising a flat elongated member provided with a longitudinally disposed slot, spaced transverse shafts extending through said slot, rollers on said shafts within the slots, and spacers on said shafts between the piston rod and the housing, and means for reciprocating the piston.

In testimony whereof, I have signed my name to this specification.

ROMEO CASTELLUCCI.